United States Patent
Duren et al.

(10) Patent No.: US 7,627,433 B2
(45) Date of Patent: Dec. 1, 2009

(54) PHASE CONTROL OF SEISMIC DATA

(75) Inventors: Richard E. Duren, Conroe, TX (US);
Andrew P. Shatilo, Houston, TX (US);
Mohamed T. Hadidi, Houston, TX (US)

(73) Assignee: Exxon Mobil Upstream Research Company, Houston, TX (US)

( * ) Notice: Subject to any disclaimer, the term of this patent is extended or adjusted under 35 U.S.C. 154(b) by 719 days.

(21) Appl. No.: 10/560,975

(22) PCT Filed: May 20, 2004

(86) PCT No.: PCT/US2004/015753

§ 371 (c)(1),
(2), (4) Date: Dec. 8, 2005

(87) PCT Pub. No.: WO2005/019864

PCT Pub. Date: Mar. 3, 2005

(65) Prior Publication Data

US 2008/0120037 A1    May 22, 2008

Related U.S. Application Data

(60) Provisional application No. 60/494,211, filed on Aug. 11, 2003.

(51) Int. Cl.
*G01V 1/00*    (2006.01)
*G06F 17/40*    (2006.01)

(52) U.S. Cl. .............................. 702/17; 702/14; 702/15; 702/187; 367/41

(58) Field of Classification Search ............. 702/14–18, 702/66–72, 187–190; 367/73, 41
See application file for complete search history.

(56) References Cited

U.S. PATENT DOCUMENTS

| 4,348,749 A | 9/1982 | Galbraith ..................... 367/46 |
| 4,646,274 A * | 2/1987 | Martinez ..................... 367/41 |
| 4,893,694 A | 1/1990 | Solanki et al. ............. 181/111 |
| 5,173,879 A | 12/1992 | Cung et al. ................... 367/46 |
| 5,173,880 A | 12/1992 | Duren et al. .................. 367/73 |
| 5,247,486 A | 9/1993 | Regnault ..................... 367/23 |
| 5,384,752 A | 1/1995 | Duren et al. .................. 367/38 |

(Continued)

OTHER PUBLICATIONS

Claerbout, J.F. (1985) *Fundamentals of geophysical data processing*, Blackwell Scientific Publications, 49.

(Continued)

*Primary Examiner*—Edward Raymond
*Assistant Examiner*—Phuong Huynh
(74) *Attorney, Agent, or Firm*—Exxon Mobil Upstream Research Co. Law Dept.

(57) ABSTRACT

Method for controlling the phase spectrum of seismic data to match assumptions inherent in subsequent processing steps. The source signature, after processing with the same initial processing steps used on the data, is used to design a phase control filter that shapes the seismic data to have a minimum phase spectrum or whatever other phase spectrum the subsequent processing algorithms may assume. The processed data is then filtered with a second phase-control filter, also designed using the parallel-processed signature, to shape the data to zero phase or whatever other phase may be desired for interpretation of the data.

6 Claims, 2 Drawing Sheets
(1 of 2 Drawing Sheet(s) Filed in Color)

U.S. PATENT DOCUMENTS 6,678,207 B2   1/2004   Duren .................. 367/24

OTHER PUBLICATIONS

Connelly and Hart (1985) "Model-Based Wavelet Processing of Deconvolved Seismic Data", *55th Ann. Internat. Mtg.,Soc. Expl. Geophys., Expanded Abstracts*, S12.2, pp. 491-495.

Gibson and Larner (1984) "Predictive deconvolution and the zero-phase source," *Geophysics* 49, pp. 379-397.

Hootman and Hart (1998) "The realities of processing mixed-source seismic surveys," *68th Ann. Internat. Mtg., Soc. Expl. Geophys., Expanded Abstracts*, pp. 1436-1439.

Hart D. et al. (2000) "Achieving Consistent and Stable Phase with Mixed-Source Surveys", *Canadian Soc. of Explor. Geophysicists*, Sep. 5, 2000, Denver Colorado, 6 pgs.

Robinson and Treitel (1980) *Geophysical Signal Analysis*, Prentice-Hall, pp. 170, 251, 267.

Sheriff, R. E. (2000) *Encyclopedic Dictionary of Exploration Geophysics*, 4th Ed.

Sheriff and Geldart (1995) *Exploration Seismology*, 2nd Ed., Cambridge University Press, 181.

EP Search Report #RS 110371 (Feb. 9, 2004), 2 pgs.

PCT International Search Report (Mar. 14, 2005), 3 pgs.

PCT Written Opinion (Mar. 14, 2005), 3 pgs.

\* cited by examiner

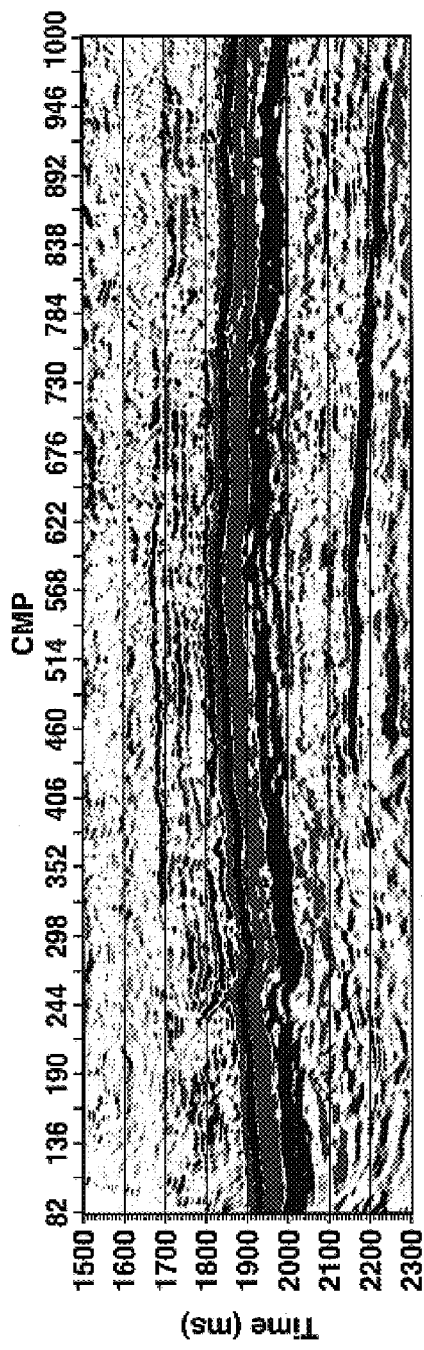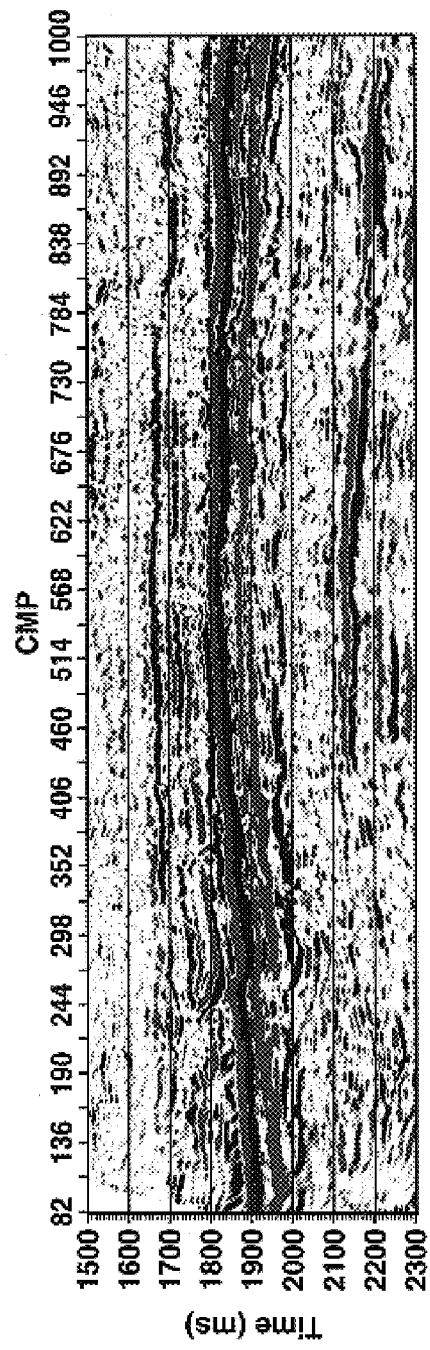

PHASE CONTROL OF SEISMIC DATA

This application is the National Stage of International Application No. PCT/US2004/015753, filed May 20, 2004, which claims the benefit of U.S. Provisional Patent Application No. 60/494,211, filed Aug. 11, 2003.

FIELD OF THE INVENTION

This invention relates generally to the field of geophysical prospecting and, more particularly, to processing of seismic data. Specifically, the invention is a method for control of wavelet phase during seismic data processing.

BACKGROUND OF THE INVENTION

Phase spectrum of the seismic wavelet is an important characteristic of seismic data. There are two major aspects of the seismic data phase control process. The first aspect is control of the seismic wavelet during intermediate processing steps. The second is phase control of the final seismic processing product, i.e., the seismic image. The first objective, wavelet phase control during intermediate processing steps, is important because some data processing methods assume particular phase properties of input data. If the input data deviates from the particular assumption, the processing method will produce a related error. Thus, careful phase control at this stage insures that input phase specification errors are reduced and the efficiency of intermediate processing steps with respect to the wavelet phase treatment is enhanced. The second objective, phase control of the seismic image, is important because detailed interpretation of seismic data may depend on the wavelet phase, and interpreters usually prefer a seismic wavelet with a particular phase property such as zero phase. A zero-phase wavelet in the seismic image means that the data have the highest possible resolution for a given amplitude spectrum. Such data are usually easier to interpret. It should be noted that both of the above-described phase control aspects are related in the sense that better phase control during intermediate processing results in better quality data before final conversion to (for example) zero phase and hence to a better quality final (zero-phase) product.

For example, there are typically modules in the processing stream that assume that the data being processed have a minimum phase spectrum. Nevertheless, the data will typically have a phase spectrum that is not minimum phase. (A concise discussion of wavelet phase may be found in the *Encyclopedic Dictionary of Exploration Geophysics* by R. E. Sheriff, 4th Ed. (2002) published by the Society of Exploration Geophysicists, in the definition of "phase characteristics." See also the definition of "wavelet" as well as other terminology used herein.) Thus, error might be introduced by processing data that is not minimum phase.

One such module in a typical seismic data processing stream that assumes minimum phase property of the seismic wavelet is predictive deconvolution. Sheriff defines "deconvolution" as a "data processing technique applied to the seismic data for the purpose of improving the recognizability and resolution of reflected events." The purpose of performing predictive deconvolution is to remove a predictable part of the seismic data defined in terms of a prediction distance, thus attenuating periodic multiples and, as an option, compressing the wavelet. This technique is discussed in the literature, for example by Robinson and Treitel in *Geophysical Signal Analysis*, Prentice-Hall (1980). In discussing the method of predictive deconvolution on page 267, the authors state, "it depends on the deterministic hypothesis that the basic seismic waveform associated with each of these events is minimum delay." (See also page 29.)

Another module commonly used in seismic data processing that assumes minimum phase, or delay, is the receiver consistent deconvolution method. The purpose of this method is to correct the wavelet shape for receiver-related effects. A related but more general technique is surface consistent deconvolution which provides decomposition of the seismic wavelet into source, receiver, offset and common midpoint terms. Application of only one term from the solution, the receiver term, is equivalent to the result from receiver-consistent deconvolution.

Gibson and Larner pointed out the problem in 1984 in the context of vibroseis data processing (seismic data generated by a vibrator source). Predictive deconvolution is commonly applied to such data even though, as Gibson and Larner state, "this process involves a minimum phase assumption." ("Predictive deconvolution and the zero-phase source," *Geophysics* 49, 379-397 (1984)) As the authors note, vibroseis data will be much closer to zero phase. They disclose a solution in the form of correcting the phase of the original vibroseis data toward minimum phase before the deconvolution, and they illustrate the effectiveness of this approach. They use a phase correction filter based on a correlated vibroseis signature, the Klauder wavelet. However, their method of designing a minimum phase filter relies on statistical inferences from the seismic data rather than a deterministic approach such as is disclosed in the present invention. Moreover, Gibson and Larner do not account for phase distortions that can be caused by processing steps (e.g., frequency filters) that often precede predictive deconvolution in a typical processing stream. Hootman and Hart propose using the Gibson-Larner approach to compensate for phase differences arising when mixed sources (e.g., vibroseis and dynamite) are used in the same survey. ("The realities of processing mixed-source seismic surveys," 68th Ann. Internat. Mtg., Soc. Expl. Geophys., *Expanded Abstracts*, 1436-1439 (1998)).

Connelly and Hart propose a method of making a phase correction post stack, after predictive deconvolution has been applied (pre-stack) to the data traces. (55th Ann. Internat. Mtg., Soc. Expl. Geophys., *Expanded Abstracts*, 491-495 (1985)) For the most part, this method addresses only the second aspect of the phase control process, i.e., phase of the final seismic image. Furthermore, their post-stack approach relies on the commutative property of linear shift-invariant operations. Therefore, this requires all processes prior to the stack to be linear shift-invariant. Also, like Gibson and Larner, no attention is given to the problem of phase distortion from steps preceding predictive deconvolution.

Hart and Hootman point out that surface-consistent deconvolution is "subject to the same assumptions made when performing predictive deconvolution, which includes that there is a minimum-phase wavelet . . . " ("Achieving consistent and stable phase with mixed-source surveys," paper given at Sep. 5, 2000 Technical Luncheon, available at web site http://cseg.ca/luncheons/200009/) They propose using the approach disclosed in the Connelly and Hart paper cited above to correct this problem.

Martinez (U.S. Pat. No. 4,646,274) and Galbraith (U.S. Pat. No. 4,348,749) teach a method for using a vibrator source signature to correct for phase distortion introduced in standard processing of the data. They propose measuring the true ground force imparted to the earth by the vibrator to develop a phase correcting inverse filter. Like the method of Connelly and Hart, the filter is to be applied to the data after the processing.

Although minimum phase is preferred for processing steps such as predictive deconvolution, a zero-phase wavelet is preferred for the post-processing interpretation steps. (See Connelly and Hart, and also Sheriff and Geldart, *Exploration Seismology*, $2^{nd}$ Ed., Cambridge University Press, 181 (1995). This is because zero-phase wavelets have the simplest shape and the highest peak for a given amplitude spectrum. Further, the peak occurs at the reflection time of the event. This alignment is important since the seismic wavelet generally broadens with increasing depth, with a zero-phase wavelet remaining symmetrical about the event time.

Robinson and Treitel make an argument at page 251 that reverberation pulse-train waveforms will arrive at the receiver exhibiting minimum delay, "or at least approximately so." Nevertheless, the person skilled in the art of seismic processing will know that this assumption that the seismic data is minimum phase is often not accurate. The present invention provides a method of avoiding the error that can result from assuming the data have minimum phase spectrum.

Duren and Anderson disclose in U.S. Pat. No. 5,384,752 the following: "Because of the shortcomings of the statistical data analysis methods, deterministic methods are generally recognized as superior methods of analyzing seismic data. Deterministic methods involve directly measuring the waveform of the source pulse . . . [and using] a source pulse function that is based on the actual pulse instead of an estimated wavelet." What is needed is a thorough, deterministic, pre-stack method of correcting wavelet phase spectrum to be consistent with assumptions in common data processing steps such as predictive deconvolution and also to shape the phase spectrum of the processed data for the following interpretation phase. The present invention satisfies these needs.

SUMMARY OF THE INVENTION

In one embodiment, the invention is a method for controlling wavelet phase spectrum in processing of any seismic data, which comprise using the measured or calculated source signature wavelet, after processing it through the same initial processing steps as are used on the data, to construct a shaping filter to convert the data to minimum phase, applying the filter to the data before processing steps that assume minimum phase, processing the minimum-phase seismic data, using the parallel-processed source signature to construct a second shaping filter to convert the data to zero phase, and applying the second filter to the processed seismic data.

BRIEF DESCRIPTION OF THE DRAWINGS

The patent or application file contains at least one drawing executed in color. Copies of this patent or patent application publication with color drawings will be provided by the Office upon request and payment of the necessary fee.

The present invention and its advantages will be better understood by referring to the following detailed description and the attached drawings in which:

FIG. 2A shows actual seismic data after typical processing steps with no phase control; and FIG. 2B shows the same data after processing by the present inventive method.

Figure 1:
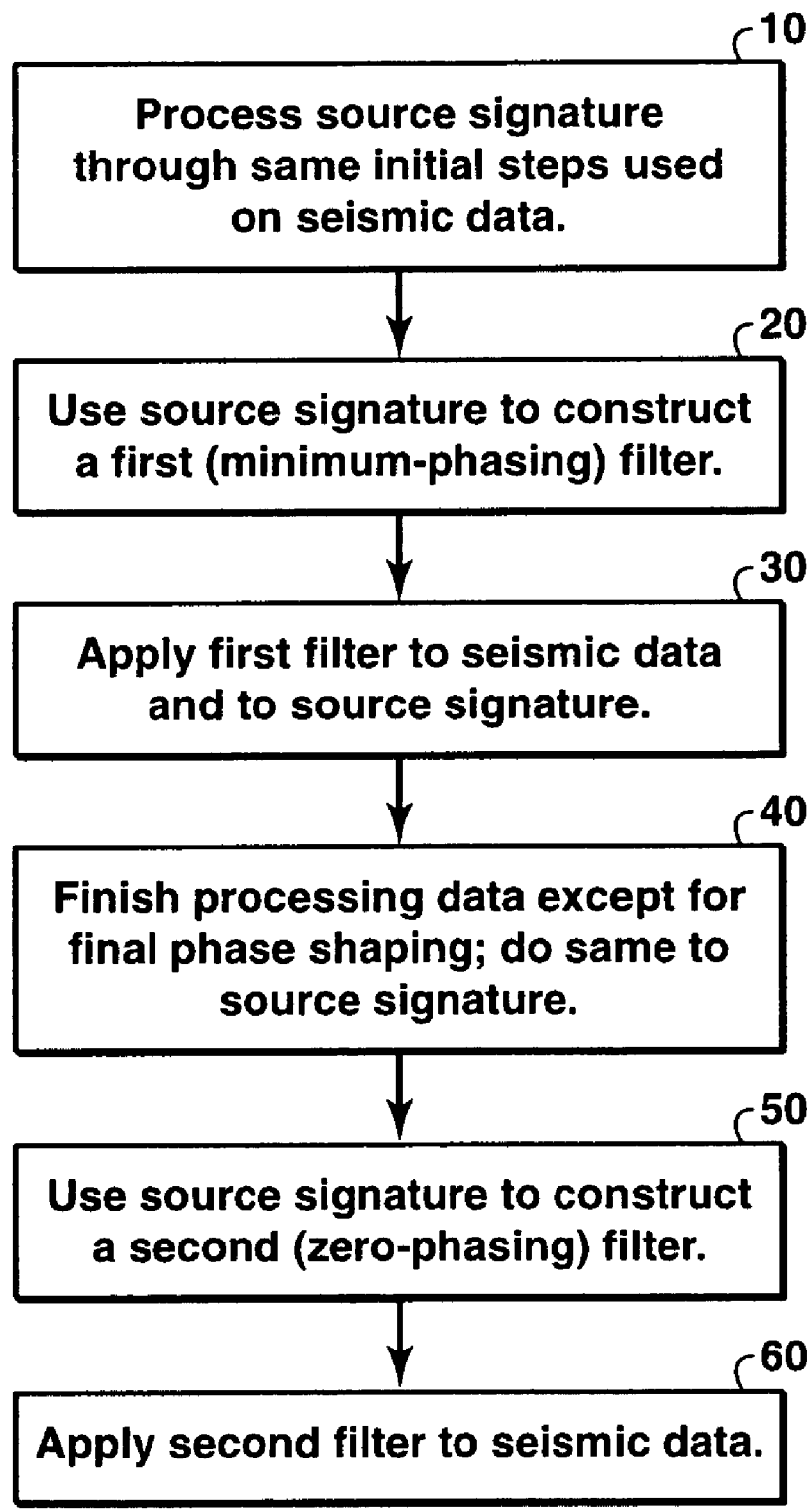
FIG. 1 is a flow chart showing the primary steps of one embodiment of the present inventive method.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications, and equivalents that may be included within the spirit and scope of the invention, as defined by the appended claims.

DETAILED DESCRIPTION OF THE PREFERRED EMBODIMENTS

In the present invention, the source signature, S(t), is used to derive a filter for converting the data to minimum phase before such steps as predictive deconvolution and receiver consistent deconvolution. The source signature is the output of a seismic source measured at or near the source before the seismic wave can be altered by the media it must traverse before arriving at a detector. In the case of a vibrator source, the signature may be measured by accelerometers mounted on the vibrator. In the case of an air gun, the signature may be measured by locating a hydrophone in the water directly beneath the air gun. In some cases, the source signature may be modeled with sufficient accuracy in lieu of making the more expensive direct measurement.

FIG. 1 is a flow chart indicating the main steps in one embodiment of the present inventive method. At step 10 in FIG. 1, the source signature is processed through the same initial processing steps as the data from the seismic receivers. Those initial steps may include, for example, an anti-alias filter followed by bimating, or selecting every other sample of the digital data. The anti-alias filter is normally a high-cut filter applied before a sampling step such as the bimating step. The purpose of such a filter is to attenuate high frequencies that will "alias" (cause frequency ambiguity) upon sampling. The purpose of bimating is to reduce the data volume to be processed without seriously affecting the accuracy of results. Another example of an initial processing module that might come next is a band-pass filter to attenuate noise. Step 10 typically includes all processing modules that do not assume minimum phase and that come before the first module in the processing stream that does assume minimum phase. At a minimum, step 10 should not include any modules that do assume minimum phase if the full benefit of the present invention is sought.

As stated, the (digitized) source signature wavelet is put through the same initial processing steps as the data. An exception would be a step that would not be applicable by its nature to the source signature. An example of that is the scaling and summation step that is taught by Duren in U.S. Patent Publication No. 2003/0048696 (Mar. 13, 2003) in order to remove the receiver ghosting interference from two-component ocean bottom cable data.

At step 20 of FIG. 1, the source signature S(t) after step 10 is used to design and construct a filter that will convert the source signature to minimum phase. The mathematical basis for one such filter is as follows, where $S_{mph}(t)$ is the minimum phase signature equivalent to S(t).

The Fourier transform of S(t), a complex quantity, may be written as $$S(\omega)=|S(\omega)|\exp\{-j[Ps(\omega)]\}, \quad (1)$$

where $|S(\omega)|$ is the signature's amplitude spectrum, and $Ps(\omega)$ denotes the signature's actual phase spectrum, $\omega$ is frequency and $j=\sqrt{-1}$.

By definition, $S_{mph}(t)$ is a function with the same amplitude spectrum, $|S(\omega)|$, as S(t) but with a minimum phase spectrum, $P_{mph}(\omega)$. $P_{mph}(\omega)$ and $Ps(\omega)$ are, of course, generally different. The problem of finding $P_{mph}(\omega)$ is known as "spectral factorization" which has been investigated in the art. (See J. F.

Claerbout, *Fundamentals of geophysical data processing*, Blackwell Scientific Publications, 49 (1985)). Though the problem is not trivial, a number of spectral factorization methods have been proposed. For instance, the Kolmogoroff method establishes a relationship between the logarithm of the amplitude spectrum and the corresponding minimum-phase spectrum via Hilbert transform. Thus, $P_{mph}(t)$ may be estimated from a logarithm of $|S(\omega)|$ using Hilbert transform.

The desired phase-shaping filter, $F_{mph}(t)$, can be written in frequency domain as follows $$F_{mph}(\omega) = \exp\{-j[P_{mph}(\omega) - Ps(\omega)]\}. \quad (2)$$

The amplitude characteristic of the filter is constant and equal to a unity. The person skilled in the art will know variations on and alternatives to the above-described method of designing a phase-control filter. All such methods are within the scope of the present invention.

The filter constructed at step 20 is then applied in step 30 to the seismic data. This will shape the seismic wavelet to its minimum phase equivalent. In one embodiment of the present invention, the process is finished. The data is now suitable for processing by modules such as receiver-consistent deconvolution and predictive deconvolution that assume minimum phase. If for some reason the processing steps after step 30 assume some phase other than minimum phase, the filter designed in step 20 would be constructed so that its application would bring the phase of the data to the appropriate phase.

In another embodiment of the present invention, the previously described steps are followed by step 40 in which the remaining processing steps are performed on the seismic data and on the now minimum-phase source signature, i.e., $S_{mph}(t)$, produced as a result of shaping by the same filter used on the data in step 30. At step 50, the source signature after step 40 is used to design a second phase-control filter to shape the wavelet to whatever phase spectrum is desired for the data interpretation stage to follow, usually zero phase. A zero-phase wavelet is preferred because for a given amplitude spectrum, zero-phase wavelets have the simplest shape and the highest peak. Further, the peak occurs at the reflection time of the event. This alignment is important since the seismic wavelet generally broadens with increasing depth, but a zero-phase wavelet will remain symmetrical about the event time. This second phase-shaping filter may be designed, in principle, in the same way as described above for the first phase-shaping filter.

Let $S'_{mph}(t)$ be the source signature after step 40, i.e., after being subjected to the processing steps used on the seismic data such as predictive deconvolution, surface consistent deconvolution, band pass filtering, etc. Thus, $S'_{mph}(t)$ and the output of the minimum-phasing filter of Eq. (2), $S_{mph}(t)$, are generally not the same. One method of designing a phase-shaping filter to yield the zero-phase equivalent signature, $S'_{zph}(t)$, may be described as follows.

Analogous to Eq. (1), the complex spectrum of the $S'_{mph}(t)$, $S'_{mph}(\omega)$, may be easily calculated, e.g., using a Fourier transform, and written as $$S'_{mph}(\omega) = |S'_{mph}(\omega)| \exp\{-j[P'_{mph}(\omega)]\}, \quad (3)$$

where $|S'_{mph}(\omega)|$ and $P'_{mph}(\omega)$ denote the amplitude and phase spectra, respectively.

By definition, the zero-phase equivalent of $S'_{mph}(t)$ is a function $S'_{zph}(t)$ with the same amplitude spectrum, $|S'_{mph}(\omega)|$, but zero phase spectrum, i.e., $P'_{zph}$=zero. The problem is trivial, and $S'_{zph}(t)$ is completely defined by $|S'_{mph}(\omega)|$.

The desired shaping filter $F_{zph}(t)$ is a phase filter that can be written in spectral domain as follows:

$$F_{zph}(\omega) = \exp\{j[P'_{mph}(\omega)]\}. \quad (4)$$

The amplitude characteristic of the filter is constant and equal to a unity.

Just as with the minimum-phasing filter, persons skilled in the art may know of variations or alternative ways to construct the zero-phasing filter. The filters from Eq. (2) and Eq. (4) have been derived in frequency domain. An alternative approach using least mean-square shaping filters may be used to produce finite length filters in the time domain (e.g., see Robinson and Treitel, 170).

At step 60, the second phase-control filter, e.g., the filter from Eq. (4), is applied to the data, which are now ready for (possibly) removal of phase dispersion due to attenuation and for subsequent processing and interpretation. A deterministic dispersion correction is generally required before the data are considered to have zero phase spectrum. This is typically accomplished by application of a filter called an inverse Q filter. To clarify the reference to subsequent processing, the processing flow addressed in this application or patent, including the appended claims, does not include such possible steps as seismic imaging (migration) stack and post stack processing, for which the phase control preference is usually the same as for interpretation.

The value of controlling the phase of the data to be consistent with the assumptions of the processing algorithms is common to all seismic data, P-wave or S-wave, however acquired. For example, seismic vibrator data is typically initially correlated with a reference signal, the pilot sweep signal that is used to control the vibrator. The result of such a correlation is to limit the phase spectrum to zero phase, or close thereto. This is not optimal for ensuing processing steps if those steps assume a different phase spectrum such as minimum phase. For a vibrator source, the source signature may be measured, for example with geophones or hydrophones located appropriately relative to the source, or with accelerometers mounted on the source, or the signature may be modeled. Similarly, data produced by impulsive sources such as explosives may not be minimum phase. Signatures for explosive sources may be measured or modeled.

FIGS. 2A and 2B show actual examples of processed ocean-bottom-cable seismic data. The data in FIG. 2A were processed using a conventional processing stream, whereas FIG. 2B shows the same data after processing with the same processing stream but with the incorporation of the present inventive method. A clearer and higher resolution image is obtained using phase control as provided by the present invention. For example, the higher amplitude (red) bands in the range 1800-2000 ms are more sharply defined and less smeared.

The foregoing description is directed to particular embodiments of the present invention for the purpose of illustrating it. It will be apparent to one skilled in the art that many modifications and variations to the embodiments described herein are possible. All such modifications and variations are intended to be within the scope of the present invention, as defined in the appended claims.

We claim:

1. In a series of seismic data processing steps to produce a seismic image of a subsurface region from seismic data collected using a seismic source with a known signature wavelet, wherein at least one processing step assumes a particular phase property for input data, a phase control method comprising:

(a) using the source signature to design a first phase-control filter to limit wavelet phase spectrum consistent with said phase assumption or assumptions;

(b) applying the first phase-control filter to the seismic data before said at least one processing step;

wherein before use in (a), the source signature is first processed with any processing steps applied to the seismic data before said first phase-control filter is applied in (b);

(c) after applying the first phase-control filter in (b), performing all subsequent processing steps on the phase-controlled seismic data, thereby transforming the seismic data into a version more representative of the subsurface region; and (d) imaging physical structure of the subsurface region using the transformed seismic data.

2. The method of claim 1, wherein the first phase-control filter shapes the source signature to minimum phase.

3. The method of claim 1, wherein said series of seismic data processing steps concludes with a second phase-control filtering of the seismic data.

4. The method of claim 3, wherein the second phase-control filter shapes the source signature to zero phase.

5. The method of claim 1, wherein said at least one processing step that assumes a particular phase property comprises receiver-consistent deconvolution and predictive deconvolution.

6. The method of claim 3, wherein said second phase-control filter is designed by a method comprising applying the first phase-control filter to the source signature from which it was designed, then processing the filtered source signature with said all subsequent processing steps except the final step where the second phase-control filter will be applied, and then using the resulting source signature to design a second phase-control filter to limit wavelet phase consistent with post-processing needs.

* * * * *